C. F. MOORE & H. E. BROWN.
SCOOP BALANCE FOR WEIGHING SCALES.
APPLICATION FILED SEPT. 9, 1914.
1,166,775.   Patented Jan. 4, 1916.
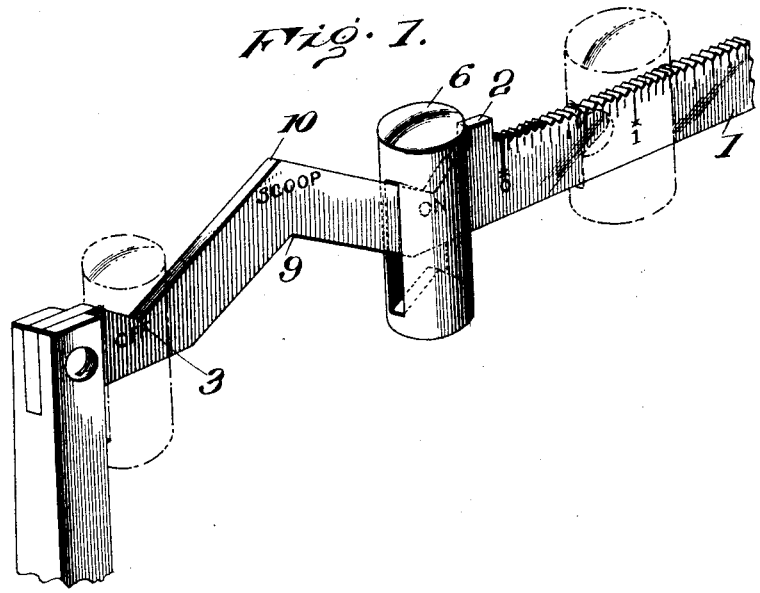
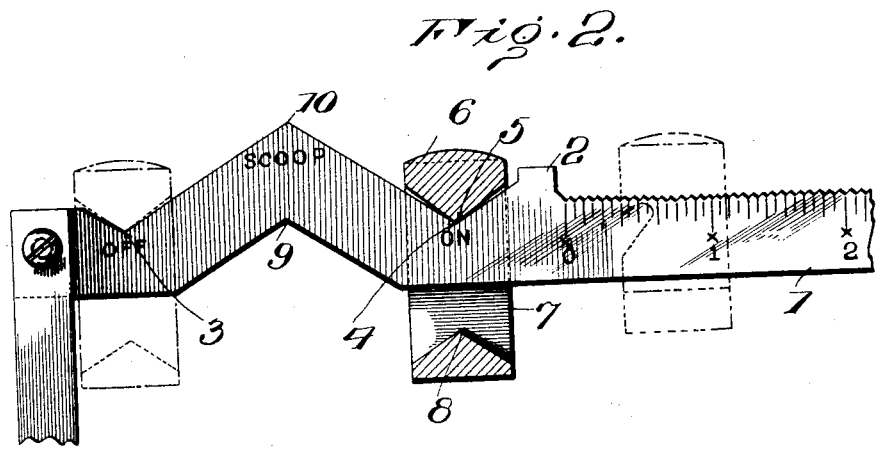

UNITED STATES PATENT OFFICE.

CHARLES F. MOORE AND HIRAM E. BROWN, OF BENNINGTON, VERMONT, ASSIGNORS TO BENNINGTON SCALE COMPANY, OF BENNINGTON, VERMONT, A CORPORATION OF VERMONT.

SCOOP-BALANCE FOR WEIGHING-SCALES.

1,166,775. Specification of Letters Patent. Patented Jan. 4, 1916.

Application filed September 9, 1914. Serial No. 860,898.

*To all whom it may concern:*

Be it known that we, CHARLES F. MOORE and HIRAM E. BROWN, citizens of the United States, residing at Bennington, in the county of Bennington and State of Vermont, have invented certain new and useful Improvements in Scoop-Balances for Weighing-Scales, of which the following is a specification, reference being had therein to the accompanying drawing.

This invention relates to certain new and useful improvements in scoop balances for weighing scales, the object being to provide a scale beam of such a construction in connection with a counter-balancing poise for counter balancing the scale when the scoop is in position on the scale and off of the same, in order to obtain the correct balance of the beam.

Another object of the invention is to provide a scale beam which is so constructed that the counter-balancing poise can only remain in two positions upon the beam so as to indicate to the purchaser that the scale is being used with a scoop or without a scoop.

Another object of the invention is to provide a scale beam with a compound angle portion forming two substantially V-shaped seats adapted to receive the knife-edge portion of the counter-balancing poise in order to obtain a fine adjustment, said counter-balancing poise seating itself in position within either of the seats by its own weight.

In the drawings—Figure 1 is a perspective view of our improved scoop balance, and Fig. 2 is a side elevation showing the counter poise in sections.

In carrying out our invention we employ a scale beam 1 having at one end the usual V-shaped notches to receive the weighing poise which is slidably mounted thereon in the ordinary manner, the movement of the same being limited by stop 2. The inner end portion of the beam is provided with a compound angle portion forming two seats 3 and 4 which are substantially V-shaped and are adapted to receive the knife-edge portion 5 of a counter-balancing poise 6 which is slidably mounted upon the compound angle portion, the opening 7 thereof terminating in a substantially knife-edge portion 8 at its bottom which is adapted to fit within the substantially V-shaped intermediate portion 9 of the compound angle portion of the beam.

In Figs. 1 and 2 I have shown the counter-balancing poise in position within the seat 4 of the beam in which position the scoop is adapted to be used in connection with the scales and when it is desired to use the scales without the scoop the counter-balancing poise 6 is moved upwardly over the portion 10 of the beam and by releasing the same it will slide down the inclined portion of the beam by gravity and seat itself in position within the seat 3. It will be noted that the knife-edge portion of the counter-balancing poise is not of the same shape as the seats 3 and 4 in order to only bring into contact the knife-edge thereof with the respective seats of the beam whereby the counter-balancing poise will maintain its equilibrium.

In moving the counter-balancing poise from one seat to the other the knife-edge portion 8 is brought into engagement with the portion 9 of the beam so as to allow the counter-balancing poise to be adjusted from one side to the other.

From the foregoing description it will be seen that we have provided a novel form of scale beam and poise by means of which the scale beam will be properly balanced when a scoop is being used or when the same has been removed and one in which the counter-balancing poise can only assume two positions so that a purchaser noting the scale can readily detect whether the counter-balancing poise is in its proper position.

What we claim is:—

1. A scoop balance for weighing scales, comprising a horizontally disposed beam having at the fulcrum end thereof, a pair of spaced seats separated by oppositely inclined portions terminating in an apex portion, in a plane above the horizontally disposed portion of said beam, a counter-balancing poise slidably mounted upon said inclined portions and capable of being held only in either one or the other of said seats, and means for limiting the movement of said poise.

2. A notched beam for weighing scales having an enlarged apex-shaped portion adjacent the fulcrum end thereof forming oppositely inclined portions terminating in spaced seats, and a counter-balancing poise slidably mounted upon said apex-shaped portion and capable of being seated only in either of said seats for counter-balancing the beam with the scoop off of or the scoop on, the same.

3. A scoop balance for weighing scales, comprising a notched beam having a compound angled smooth portion adjacent the fulcrum end thereof and spaced from the notched portion by a stop, said angled portion forming oppositely disposed inclines terminating in substantially V-shaped seats, and a counter-balancing poise slidably mounted upon the angled portion of said beam having a knife edge capable of seating itself in either of said seats.

In testimony whereof we affix our signatures in presence of two witnesses.

CHARLES F. MOORE,
HIRAM E. BROWN.

Witnesses:
C. L. HOLDEN,
E. H. HOLDEN.